United States Patent [19]

Oguino

[11] Patent Number: 4,609,945
[45] Date of Patent: Sep. 2, 1986

[54] VIDEO PROJECTION APPARATUS WITH TEMPERATURE COMPENSATION DEVICE

[75] Inventor: Masanori Oguino, Yokohama, Japan

[73] Assignee: Hitachi, Ltd., Tokyo, Japan

[21] Appl. No.: 620,930

[22] Filed: Jun. 15, 1984

[30] Foreign Application Priority Data

Jun. 15, 1983 [JP] Japan .................... 58-105874

[51] Int. Cl.[4] .............................................. H04N 5/74
[52] U.S. Cl. ................................. 358/237; 358/233; 358/64; 350/253
[58] Field of Search ............... 358/237, 233, 64, 250; 350/533, 253

[56] References Cited

U.S. PATENT DOCUMENTS 4,405,949 9/1983 Hockenbrock et al. ............ 358/237
4,511,927 4/1985 Bauer ................................. 358/250

*Primary Examiner*—James J. Groody
*Assistant Examiner*—E. Anne Toth
*Attorney, Agent, or Firm*—Antonelli, Terry & Wands

[57] ABSTRACT

In a video projection apparatus including a projection lens, a cathode-ray tube and a projection screen, a layer of a medium whose refractive index $n_p$ decreases with a temperature rise is disposed between the projection lens and the faceplate of the cathode-ray tube, and the thickness $l_p$ of the medium layer is selected to substantially satisfy the following equation thereby compensating the temperature-dependent variation of the focal length of the principal lens:

$$\frac{l_p}{n_p f} \cdot \frac{\Delta n_p}{n_p \Delta T} \geqq \frac{0.3K}{2} \cdot \frac{\Delta f}{f \Delta T} \cdot \left(1 + \frac{1}{M}\right)^2$$

where $\Delta T$ is a temperature variation; $\Delta n_p$ is a variation of the refractive index $n_p$ due to the temperature variation $\Delta T$; f is the focal length of the projection lens; K is a constant representing the proportion of the power of plastic lenses to the total power when the projection lens is of a hybrid type; $\Delta f$ is a variation of the focal length f due to the temperature variation $\Delta T$; and M is the magnification of projected images.

4 Claims, 5 Drawing Figures

VIDEO PROJECTION APPARATUS WITH TEMPERATURE COMPENSATION DEVICE

BACKGROUND OF THE INVENTION

This invention relates to a video projection apparatus employing a lens such as a plastic lens whose focal length varies depending on the ambient temperature, and more particularly to an apparatus of the kind above described which is provided with a temperature compensation device capable of compensation of variations of the focal length of the lens due to temperature variations.

FIG. 1 shows the basic structure of a video projection apparatus. In FIG. 1, reference numerals 1, 2 and 3 designate a faceplate of a cathode-ray tube (CRT), a projection lens and a projection screen respectively. Although the lens 2 is usually a combination of a plurality of lenses, a single lens is illustrated in FIG. 1 as a representative of the combined lenses.

With the progress of the design and manufacturing technique of plastic lenses, a methacrylic resin having a high transparency and a light weight has become increasingly used in recent years as the material of plastic lenses.

Since the methacrylic resin has a refractive index variable depending on the ambient temperature, and, therefore, the focal length of a lens made of the methacrylic resin varies depending on the ambient temperature, such a lens when used as a projection lens has been defective in that the focus of a projected image tends to be degraded with variations of the ambient temperature.

FIG. 2 illustrates how the focal length of such a plastic lens increases with a temperature rise. In FIG. 2, the solid lines with arrows show the optical path at the room temperature, and the focal length of the lens 2 is f in that case:

At a higher temperature, the focal length f of the lens 2 increases by $\Delta f$ as shown by the optical path represented by the dotted lines with arrows.

It is well known that the focal length f is given by the following expression (1):

$$f \approx \left( \frac{1}{R_1} + \frac{1}{R_2} \right) (n - 1) \qquad (1)$$

where
- n: refractive index of lens medium (plastic), $n \approx 1.5$.
- $R_1$, $R_2$: paraxial radii of curvature at planes of incidence and exit respectively of the lens.

It is known that the temperature dependence of the refractive index of the methacrylic resin is given by the following approximate expression (2) when the temperature T varies by $\Delta T$ and the resultant variation of $(n-1)$ is $\Delta(n-1)$:

$$\frac{\Delta(n-1)}{(n-1)\Delta T} \approx -240 \text{ PPM/}^\circ\text{C}. \qquad (2)$$

where
$PPM \equiv 10^{-6}$.

Since the coefficient of linear expansion of the methacrylic resin is about 80 PPM/°C., the following approximate expression (3) is obtained:

$$\frac{\Delta\left(\frac{1}{R_1} + \frac{1}{R_2}\right)}{\left(\frac{1}{R_1} + \frac{1}{R_2}\right)\Delta T} \approx -80 \text{ PPM/}^\circ\text{C}. \qquad (3)$$

Substituting these values in the expression (1), the following approximate expression (4) is obtained:

$$\frac{\Delta f}{f(\Delta T)} \approx -320 \text{ PPM/}^\circ\text{C}. \qquad (4)$$

Suppose that a is the equivalent distance of the distance between the lens 2 and the faceplate 1 in FIG. 1 when calculated in terms of the distance in air, and b is the distance between the lens 2 and the projection screen 3. Then, $$\frac{1}{a} + \frac{1}{b} = \frac{1}{f} \qquad (5)$$

hence, $$a = \frac{bf}{b - f}$$

The distance b remains constant regardless of temperature variations. Therefore, in order that the focus can be maintained to be unvariable regardless of variations of the focal length f of the lens 2, it is required that the equivalent distance a varies according to the following expression (6) obtained by substituting the expression (4) in the equation (5):

$$\frac{\Delta a}{a} \approx \frac{\Delta f}{f} \left( 1 + \frac{f}{b-f} \right) \qquad (6)$$

$$= \frac{\Delta f}{f} \cdot \frac{b}{b-f} = \frac{\Delta f}{f} \left( 1 + \frac{1}{M} \right)$$

where
M: magnification of projected image

In a projection television apparatus for home use, the value of M is commonly set at about 10. Therefore, substitution of M=10 in the expression (6) provides the following expression (7):

$$\frac{\Delta a}{a\Delta T} \approx -350 \text{ PPM/}^\circ\text{C}. \qquad (7)$$

Therefore, when the principal lens is subjected to a temperature rise of 20° C. due to radiation of heat from the faceplate 1 of the CRT, the following relation is obtained:

$$\frac{\Delta a}{a} \approx -350 \text{ PPM/}^\circ\text{C}. \times 20^\circ \text{ C.} = 0.7\% \qquad (8)$$

In order that the focus can be satisfactorily maintained to be unvariable, the equivalent distance a must be changed according to the expressions (6) to (8). However, realization of this requirement according to the prior art has been extremely difficult. Therefore, when the optical path is traced in the reverse direction from the projection screen 3 toward the CRT, a focus degradation as shown by d in FIG. 2 has occurred inevitably. There is the following relation between the diameter D of the lens 2 and the focus degradation d:

$$\frac{D}{d} = \frac{a}{\Delta a} \qquad (9)$$

In the case of the lens 2 having a low f-number and a large aperture used in the projection television apparatus, its diameter D is approximately equal to one-half the height of the image area of the phosphor screen of the faceplate 1 of the CRT, the value given by the equation (9) can be regarded to represent the degradation of the resolution of the projection television apparatus in terms of the number of scanning lines due to the temperature rise of the lens 2. It can be seen, by substitution of the value of the expression (8) in the equation (9), that a lens temperature rise of 20° C. results in such a degradation of the resolution that the number of completely resolvable scanning lines is reduced to only about 140.

In view of the fact that a scene is displayed by 490 scanning lines on the screen of the CRT, such an excessive degradation of the resolution has been extremely insufficient for the complete reproduction of information.

In the prior art, a layer of a liquid is formed in a sandwich fashion on the faceplate of a CRT to be used as a coolant for the purpose of improving the adverse effect of radiation of heat from the CRT. The liquid layer can sufficiently serve the cooling purpose when it has a thickness of about 3 to 5 mm. However, the temperature compensation device according to the present invention differs distinctly from such a prior art device in its object and meritorious effects.

SUMMARY OF THE INVENTION

The present invention contemplates to obviate prior art defects as pointed out above, and it is accordingly a primary object of the present invention to provide a video projection apparatus provided with a temperature compensation device which obviates the undesirable focus degradation regardless of temperature variations and which obviates also the undesirable reduction of the number of resolvable scanning lines is the projection television apparatus.

The present invention is featured by the fact that a layer of a medium whose refractive index $n_p$ decreases with a temperature rise is disposed between a projection lens and a CRT, and the thickness of this medium layer is appropriately selected to compensate the temperature-dependent variation of the focal length of the projection lens.

According to the present invention which attains the above object, the principle of optical illusion is utilized in which one who is observing an object lying on the bottom of water from the air layer above the water level is hallucinated as if the bottom is shallower than the actual depth.

DESCRIPTION OF THE PREFERRED EMBODIMENT

Figure 3:
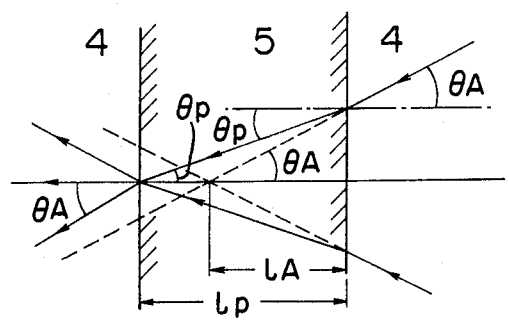
FIG. 3 is a schematic view illustrating the basic principle employed in the present invention.
Figure 4:
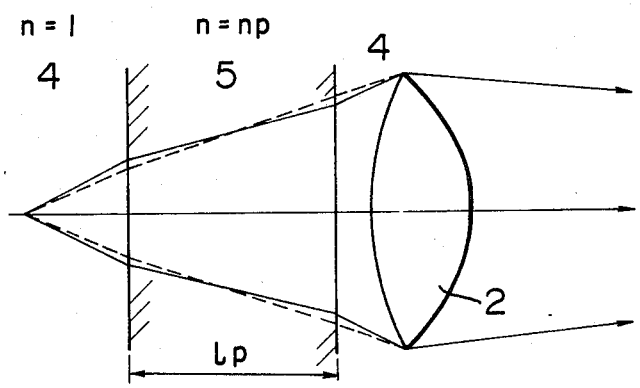
FIG. 4 is a schematic view illustrating the basic structure of the temperature compensation device according to the present invention.

FIG. 3 illustrates generally the basic principle described above. In FIG. 4, reference numerals 4 and 5 designate layers of air whose refractive index is 1 and a layer of a medium whose refractive index is $n_p$, respectively.

The following equation (10) holds from the Snell's law:

$$n_p \sin \theta_p = \sin \theta_A \qquad (10)$$

Further, from FIG. 3, the following equation (11), hence, the equation (11A) holds:

$$l_A \tan \theta_A = l_p \tan \theta_p \qquad (11)$$

$$\therefore l_A = \frac{\tan \theta_p}{\tan \theta_A} l_p = \frac{l_p}{n_p} \frac{\cos \theta_A}{\cos \theta_p} \qquad (11A)$$

Figure 1:
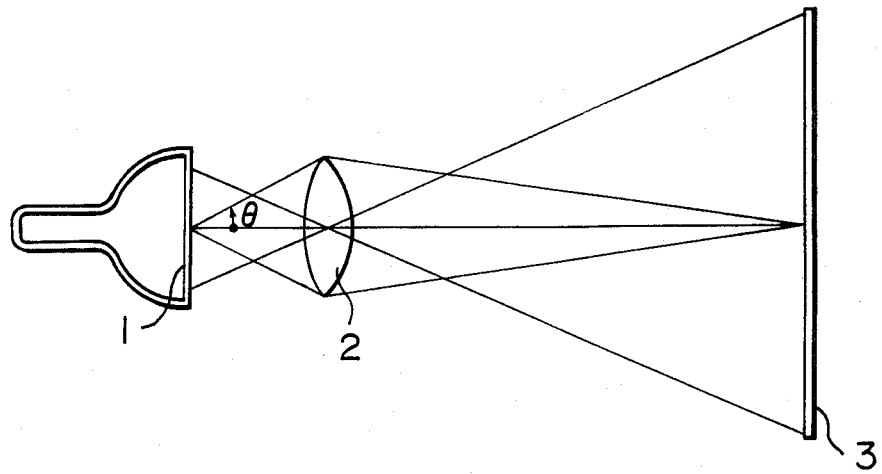
FIG. 1 is a schematic view illustrating the basic structure of a video projection apparatus.
Figure 2:
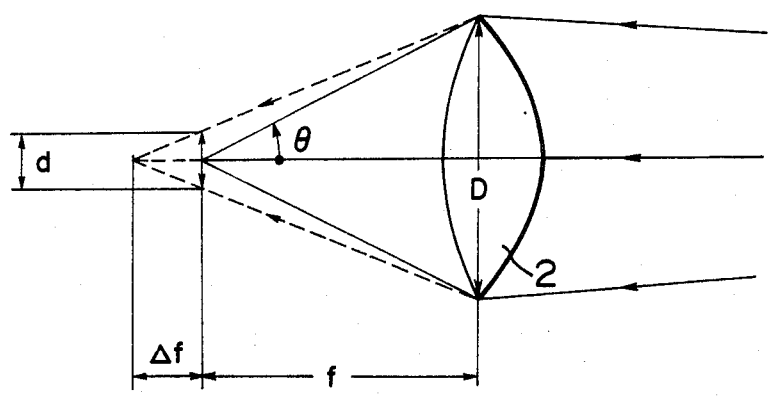
FIG. 2 is a schematic view illustrating the prior art problem.

In a projection television apparatus commonly used, the angular aperture $\theta$ in FIG. 1 is about 23°, and, therefore, the cosine terms in the equation (11A) can be ignored to provide the following expression (12):

$$l_A \approx \frac{l_p}{n_p} \qquad (12)$$

Thus, the equivalent thickness $l_A$ of the medium 5 obtained by calculation of the actual thickness $l_p$ of the medium 5 in terms of air is given by the expression (12).

Therefore, a variation $\Delta l_A$ of the equivalent thickness $l_A$ of the medium 5 due to a temperature variation is given by the following expression (13):

$$\Delta l_A \approx \frac{l_p}{n_p} \left( \frac{\Delta l_p}{l_p} + \frac{\Delta n_p}{n_p} \right) \qquad (13)$$

In usual applications, the value of $\Delta l_p/l_p$ is selected to be negligible. Therefore, the following expression holds:

$$\Delta l_A \approx \frac{l_p}{n_p} \frac{\Delta n_p}{n_p} \qquad (14)$$

A preferred embodiment of the temperature compensation device of the present invention will now be described with reference to the drawings.

FIG. 4 illustrates the basic structure of the device of the present invention. In FIG. 4, the solid lines indicate an optical path at the room temperature, and the dotted lines indicate that at a higher temperature. The thickness $l_p$ and refractive index $n_p$ of the medium 5 disposed between the projection lens 2 and the faceplate 1 of the CRT are selected to satisfy the following relation:

$$\Delta l_A = \Delta a \qquad (15)$$

From the expressions (6) and (14), the following equation (16), hence, the equation (17) is obtained:

$$\frac{l_p}{n_p} \cdot \frac{\Delta n_p}{n_p} = \frac{a \Delta f}{f} \left(1 + \frac{1}{M}\right) \quad (16)$$

$$\therefore \frac{l_p}{n_p f} \cdot \frac{\Delta n_p}{n_p} = \frac{\Delta f}{f} \left(1 + \frac{1}{M}\right)^2 \quad (17)$$

The principal factor causing the temperature rise of the lens 2 is the radiation of heat from the faceplate 1 of the CRT, and the amount of temperature rise of the medium 5 added according to the present invention and disposed nearer to the CRT than the projection lens 2 is about two times as much as that of the projection lens 2. Accordingly, the following relation is satisfied:

$$\frac{l_p}{n_p f} \cdot \frac{\Delta n_p}{n_p \Delta T} = \frac{1}{2} \cdot \frac{\Delta f}{f \Delta T} \cdot \left(1 + \frac{1}{M}\right)^2 \quad (18)$$

$$\approx \frac{1}{2} \cdot (-320 \text{ PPM/}^\circ\text{C.}) \times 1.1^2 \quad (19)$$

$$\approx -200 \text{ PPM/}^\circ\text{C.}$$

Due to the limitation from the aspect of the spatial arrangement, it is apparent that the value of $l_p$ must be smaller than that of $n_p f$ in the equation (18). In order that the present invention is to be effective, it is required that the absolute value of the left-hand member of the equation (18) is to be at least more than 30% of the absolute value of the right-hand member. Some examples of the medium 5 satisfying the above requirement are enumerated below:

| Medium | $n_p$ | $\Delta n_p/n_p \Delta T$ | Melting point | Boiling point |
|---|---|---|---|---|
| Carbon tetrachloride | 1.46 | −380 PPM/°C. | −23° C. | 77° C. |
| Ethyl alcohol | 1.36 | −290 PPM/°C. | −114° C. | 78° C. |
| Benzene | 1.50 | −410 PPM/°C. | 6° C. | 80° C. |
| Ethanediol (another name of ethylene glycol) | 1.41 | −200 PPM/°C. | not higher than −40° C. | not lower than 100° C. |
| Acetone | 1.36 | −430 PPM/°C. | −95° C. | 57° C. |
| Xylene | 1.51 | −180 PPM/°C. | −48° C. | 139° C. |
| Silicone oil | 1.41 | −290 PPM/°C. | not higher than −40° C. | 260° C. |

The temperature dependence of the refractive index in the above table is calculated from the value of the coefficient of cubical expansion $\beta$ of each medium on the basis of the following experimentally determined expression:

$$\frac{\Delta n_p}{(n_p - 1)\Delta T} \approx -\beta \quad (20)$$

Each of these materials is in the form of a liquid or a gel having a large coefficient of cubical expansion. Therefore, glass or methacrylic plates are fixedly disposed at the boundaries of the medium so as to suppress expansion and contraction of the material in the direction of its thickness (the direction of the optical axis). As will be understood from the aforementioned expression (13), leaving of the value of $\Delta l_p/l_p \Delta T$ in the relation corresponding to the coefficient of linear expansion (positive) of the medium will cancel the effect of the present invention and is therefore undesirable. It is desirable to design the mounting arrangement so as to minimize the value of $\Delta l_p/l_p \Delta T$.

Figure 5:
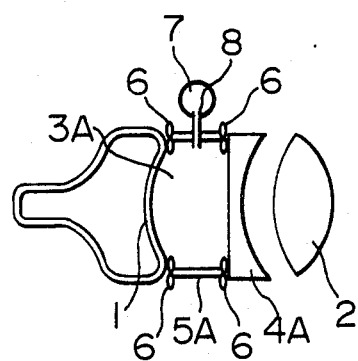
FIG. 5 is a schematic view illustrating the detailed structure of a preferred embodiment of the present invention.

FIG. 5 shows the detailed structure of a preferred embodiment of the present invention. In FIG. 5, reference numerals 1, 2, 3A, 4A, 5A, 6, 7 and 8 designate a faceplate of a CRT, a projection lens, a layer of a medium provided according to the present invention, a concave lens provided for compensation of the curvature of field, a cylindrical member of glass or a metal, an adhesive, a bag of a plastic material having a low modulus of elasticity for absorbing expansion and contraction of the medium 3A, and a conduit, respectively. The faceplate 1 of the CRT is also made concave to serve the same purpose as that of the concave lens 4A. The concave lens 4A and the projection lens 2 may be brought into contact with each other. Also, a convex lens may be used in place of the concave lens 4A to improve the f-number.

Although a single convex projection lens 2 only is illustrated and referred to in the above description, it is apparent that the present invention is equally effectively applicable to a case where a plurality of lenses are combined to constitute the projection lens 2.

The present invention is also applicable to a case where some of a plurality of lenses constituting the lens 2 are aspherical plastic lenses and the remainder are spherical glass lenses to constitute the so-called hybrid lens. The temperature dependence of glass commonly used in such glass lenses is very low.

Suppose that the proportion of the power of the plastic lenses in the hybrid lens to the total power of the hybrid lens is a constant K, and the overall focal length of the hybrid lens is f. Then, the aforementioned equation (18) should be replaced by the following equation (21):

$$\frac{l_p}{n_p f} \cdot \frac{\Delta n_p}{n_p \Delta T} = \frac{K}{2} \cdot \frac{\Delta f}{f \Delta T} \cdot \left(1 + \frac{1}{M}\right)^2 \quad (21)$$

In order that the present invention can be proved to be at least effective, it is the essential requirement that the absolute value of the left-hand member of the equation (21) is at least larger than 30% of the absolute value of the right-hand member. Since the value of K is designed to be 0.3 to 0.5, the relation provided by the equation (21) can be realized by addition of a relatively thin medium layer 3A.

When, by way of example, f and K are selected to be f=120 mm and K=0.4 respectively, and ethanediol (another name of ethylene glycol) is employed as the medium, the present invention is applicable to the following range of $l_p$:

$$l_p = (0.3 \sim 1.0) \cdot n_p f \frac{n_p \Delta T}{\Delta n_p} \cdot \frac{K}{2} \cdot \frac{\Delta f}{f \Delta T} \left(1 + \frac{1}{M}\right)^2 \quad (22)$$

$$= 15 \sim 51 \text{ (mm)}$$

It will be understood from the foregoing detailed description that the present invention provides a video projection apparatus which can overcome the prior art problem of temperature-dependent degradation of the focal length which has been the defect of plastic lenses and which can always display accurately focused beautiful images on the projection screen. The industrial merit of the present invention is therefore quite remarkable.

I claim:

1. In a video projection apparatus including at least a cathode-ray tube, a projection lens and a projection screen, a temperature compensation device comprising a layer of a medium disposed between said projection lens and a faceplate of said cathode-ray tube, said medium having a refractive index $n_p$ decreasing with a temperature rise and having a thickness $l_p$ on an optical axis, thereby compensating a temperature-dependent variation of a focal length of said projection lens, the thickness $l_p$ of said medium layer being selected to satisfy an equation $$\frac{l_p}{n_p f} \cdot \frac{\Delta n_p}{n_p \Delta T} \geqq \frac{0.3 K}{2} \cdot \frac{\Delta f}{f \Delta T} \cdot \left(1 + \frac{1}{M}\right)^2$$

where $\Delta T$ is a temperature variation; $\Delta n_p$ is a variation of the refractive index $n_p$ due to the temperature variation $\Delta T$; f is the focal length of the projection lens; K is a constant representing the proportion of the power of plastic lenses to the total power when the projection lens is of a hybrid type, $\Delta f$ is a variation of the focal point due to the temperature variation $\Delta T$; and M is the magnification of projected images.

2. A video projection apparatus according to claim 1, wherein the thickness $l_p$ of said medium layer is selected to satisfy an equation $$\frac{l_p}{n_p f} \cdot \frac{\Delta n_p}{n_p \Delta T} = \frac{K}{2} \cdot \frac{\Delta f}{f \Delta T} \cdot \left(1 + \frac{1}{M}\right)^2$$

3. In a video projection apparatus including at least a cathode-ray tube, a projection lens and a projection screen, a temperature compensation device comprising a layer of a medium disposed between said projection lens and a faceplate of said cathode-ray tube, said medium having a refractive index $n_p$ decreasing with a temperature rise and having a thickness $l_p$ on an optical axis, thereby compensating a temperature-dependent variation of a focal length of said projection lens, the thickness $l_p$ of said medium layer being selected to satisfy an equation $$\frac{l_p}{n_p f} \cdot \frac{\Delta n_p}{n_p \Delta T} \geqq \frac{0.3}{2} \cdot \frac{\Delta f}{f \Delta T} \cdot \left(1 + \frac{1}{M}\right)^2$$

where $\Delta T$ is a temperature variation; $\Delta n_p$ is a variation of the refractive index $n_p$ due to the temperature variation $\Delta T$; f is the focal length of the projection lens; $\Delta f$ is a variation of the focal point due to the temperature variation $\Delta T$; and M is the magnification of projected images.

4. A video projection apparatus according to claim 3, wherein the thickness $l_p$ of said medium layer is selected to satisfy an equation $$\frac{l_p}{n_p f} \cdot \frac{\Delta n_p}{n_p \Delta T} = \frac{1}{2} \cdot \frac{\Delta f}{f \Delta T} \cdot \left(1 + \frac{1}{M}\right)^2$$

* * * * *